United States Patent [19]
Roller et al.

[11] Patent Number: 5,419,959
[45] Date of Patent: May 30, 1995

[54] MAGNETIC RECORDING MEDIUM HAVING AN INFRA-RED LIGHT TRANSPARENT BALKCOAT LAYER

[75] Inventors: Hermann Roller, Ludwigshafen; Peter Heilmann, Bad Duerkheim; Michael Hitzfeld; Dieter Stockburger, both of Gruenstadt; Werner Latzel, Mutterstadt; Reinhold Baur, Ortenberg; Peter Engelhardt, Plankstadt; Edwin Rothfuss, Hohberg; Werner Grau, Bobenheim-Roxheim; Werner Lenz, Bad Durkheim, all of Germany

[73] Assignee: BASF Magnetics GmbH, Mannheim, Germany

[21] Appl. No.: 199,357

[22] Filed: Feb. 18, 1994

Related U.S. Application Data

[63] Continuation of Ser. No. 888,713, May 27, 1992, abandoned.

[30] Foreign Application Priority Data

May 31, 1991 [DE] Germany .................. 41 17 980.3

[51] Int. Cl.⁶ .............................................. G11B 5/00
[52] U.S. Cl. ...................... 428/327; 428/328; 428/329; 428/330; 428/331; 428/336; 428/402; 428/694 BB
[58] Field of Search .............. 428/327, 328, 329, 330, 428/331, 336, 694 BB, 900

[56] References Cited

U.S. PATENT DOCUMENTS

| | | | |
|---|---|---|---|
| 3,293,066 | 12/1966 | Haines | 117/68 |
| 4,135,031 | 1/1979 | Akashi et al. | 428/323 |
| 4,397,911 | 8/1983 | Akashi et al. | 428/323 |
| 4,446,205 | 5/1984 | Mizuno et al. | 428/327 |
| 4,684,572 | 8/1987 | Yasufuku et al. | 428/323 |
| 4,735,325 | 4/1988 | Remmers | 211/187 |

FOREIGN PATENT DOCUMENTS

| | | |
|---|---|---|
| 0105471 | 9/1987 | European Pat. Off. |
| 0322826 | 5/1989 | European Pat. Off. |
| 1197661 | 7/1970 | United Kingdom |

*Primary Examiner*—Stevan A. Resan
*Attorney, Agent, or Firm*—Keil & Weinkauf

[57] ABSTRACT

Flexible magnetic recording media consisting essentially of a web-like nonmagnetic substrate, a magnetic layer applied to one main side of the web-like substrate and a backing layer formed on the opposite main side of the substrate from a polymeric binder, at least one filler, at least one auxiliary pigment and a polyolefin having a spherical particle shape.

6 Claims, No Drawings

MAGNETIC RECORDING MEDIUM HAVING AN INFRA-RED LIGHT TRANSPARENT BALKCOAT LAYER

This application is a continuation of application Ser. No. 07/888,713, filed on May 27, 1992, now abandoned.

The present invention relates to flexible magnetic recording media consisting essentially of a web-like nonmagnetic substrate, a magnetic layer applied to one main side of the web-like substrate and a backing layer formed on the opposite main side of the substrate from a polymeric binder and nonmagnetic fillers and auxiliary pigments.

It is known that flexible magnetic recording media can be provided with backing layers containing nonmagnetizable, nonconductive and/or conductive substances.

U.S. Pat. No. 3 293 066 states that electrostatic charges on magnetic tapes, which can form in recorders at high tape speeds, can be eliminated by applying conductive backing layers, and furthermore the backs of the tapes can be made more hard-wearing by means of backing layers. Furthermore, GB-A 1 197 661 and U.S. Pat. No. 4,135,031 disclose that the winding properties of magnetic tapes can be improved by applying backing layers having a predetermined surface roughness. Such backing layers are also known for magnetic cards. EP-A 101 020 discloses special binder mixtures which, particularly with the addition of carbon black, give backing layers which have excellent adhesive strength, are very hard-wearing and are stable under conditions of high temperature and humidity.

Such backing layers are of particular importance in video tapes, in particular in those for the home video sector. Thus, inter alia, U.S. Pat. No. 4,735,325 proposes a backing layer which consists of carbon black of different particle sizes and of fillers having a Mohs' hardness of $\geq 8$ dispersed in a polymeric binder, for improving the scratch-resistance and for reducing the number of errors. In addition to improving the wear properties and reducing the abrasiveness, the proposed backing layers also serve to reduce the transparency of the tape material to light, which is necessary particularly when such tapes are used on commercial video recorders. EP-A 105 471 proposes for this purpose a backing layer based on barium sulfate/$\alpha$-iron(III) oxide with or without the special addition of carbon black. However, video tapes treated in this manner have the disadvantage that they are unsuitable for a conventional duplication method, thermomagnetic duplication (TMD). In this TMD method, a magnetic recording medium containing chromium dioxide as magnetic material is brought into contact with a master tape having a high coercive force and provided with the recording, and at the same time the chromium dioxide magnetic layer is heated above the Curie point of the chromium dioxide.

During subsequent cooling below the Curie point, the chromium dioxide is magnetized according to the information pattern of the master tape. The chromium dioxide magnetic layer is generally heated with the aid of a laser beam (usually a krypton laser having a wavelength of 1064 nm) through the back of the magnetic tape. However, this means that any backing layer present must not substantially absorb the energy of the laser beam.

It is an object of the present invention to provide a magnetic recording medium whose backing layer meets the requirements with regard to mechanical properties, such as resistance to wear and abrasiveness, while at the same time has sufficient transparency to light so that a corresponding magnetic recording medium can also be used for the TMD method.

We have found that this object is achieved by flexible magnetic recording media, essentially consisting of a web-like nonmagnetic substrate, a magnetic layer applied to one main side of the web-like substrate and a backing layer formed on the opposite main side of the substrate from a polymeric binder and nonmagnetic additives when the backing layer is obtained by dispersing a mixture essentially consisting of an organic polymer and, based on the backing layer, from 2.5 to 25% by volume of a filler, from 0.5 to 3% by volume of an auxiliary pigment and from 1 to 10% by volume of a polyolefin having a spherical particle shape, a density of from 0.9 to 1.0 and a mean particle size of from 1 to 1,000 $\mu$m and by applying the resulting dispersion to that surface of the substrate which is opposite the magnetic layer, in a layer thickness such that, after solidification of the layer, a layer thickness of from 0.1 to 2.0 $\mu$m results.

Suitable fillers for the purposes of the present invention are particulate compounds, such as silica, in particular precipitated silica, calcium carbonate, barium sulfate and/or gypsum having a mean agglomerate size of from 0.05 to 4 $\mu$m. Suitable auxiliary pigments are likewise particulate compounds selected from the group consisting of alumina, $\alpha$-iron(III) oxide, titanium dioxide, zinc ferrite and/or chromium green, having a mean agglomerate size of from 0.1 to 0.5 $\mu$m. An essential component of the backing layer of the novel magnetic recording medium is the polyolefin. These polymers have a spherical particle shape with a mean particle size of from 1 to 1,000 $\mu$m, in particular from 8 to 800 $\mu$m, advantageously from 30 to 500 $\mu$m. Low density polyolefins having an average molecular weight of from 3,000 to 25,000 and a density of from 0.9 to 1.0 g/cm$^3$ have proven particularly advantageous.

The dispersion forming the backing layer of the novel magnetic recording medium is prepared by conventional process.

Suitable organic polymers for the backing layer are the binders known for the production of magnetic recording media. These are copolyamides, polyvinylformals, polyurethane elastomers, mixtures of polyisocyanates and relatively high molecular weight polyhydroxy compounds, vinyl chloride polymers containing more than 60% of vinyl chloride building blocks, a copolymerized vinyl chloride with one or more unsaturated carboxylic acids of 3 to 5 carbon atoms as comonomers or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate, said polymers being soluble in conventional solvents. Other suitable binders are mixtures of one or more polyurethane elastomers with polyvinylformals, phenoxy resins and vinyl chloride copolymers of the abovementioned composition. Particularly preferred organic polymers are mixtures of polyurethane elastomers with phenoxy resins and of polyurethane elastomers with vinyl chloride polymers.

Cyclic ethers, such as tetrahydrofuran and dioxane, and ketones, such as methyl ethyl ketone and cyclohexanone, are preferably used as solvents for the preparation and processing of the polymers. Of course, polyurethanes can also be dissolved in other strongly polar solvents, such as dimethylformamide, pyrrolidone, dimethyl sulfoxide or ethylene glycol acetate. It is also possible to mix the stated solvents with aromatics, such as toluene or xylene, and esters, such as ethyl or butyl acetate.

For dispersing, the particulate components are mixed together with the dissolved organic polymers and conventional dispersants, such as soybean lecithin, saturated and unsaturated, straight-chain and branched fatty acids, fatty acid salts, quaternary ammonium compounds and phosphoric acid derivatives, and the mixture is processed in known dispersing apparatuses. It may also be advantageous to add conventional lubricants, such as fatty acids, fatty esters, silicone oils or fluorine-based additives to these backing layers.

The dispersion is prepared in ball mills or vertical or horizontal stirred ball mills in a conventional manner. The backing layer is preferably applied by means of engraved rollers. For evaporating the solvents and drying or curing the backing layer, the latter is passed through a heating tunnel. It is possible to apply both magnetic and backing layer dispersions in one operation or in succession. The coated films can, if required, be calendered and compacted on conventional machines by being passed between heated and polished rollers, if necessary under pressure. The thickness of the backing layer is less than 2.0 $\mu$m, in particular less than 1.5 $\mu$m, preferably from 0.3 to 0.7 $\mu$m.

In an advantageous embodiment of the novel magnetic recording media, the backing layer is composed of from 15 to 25, in particular from 20 to 25, % by volume of a precipitated silica having an $SiO_2$ content of from 98 to 99.5%, a pH of from 5 to 7 and a density of 1.9 g/cm$^3$, from 0.5 to 3, preferably from 1.5 to 2.25, % by volume of a cubic zinc ferrite having a mean particle size of from 0.1 to 0.5 $\mu$m, of a spherical $\alpha$-$Fe_2O_3$ or of an $Al_2O_3$ and from 1 to 10, preferably from 2 to 5, % by volume of a spherical low density polyolefin having a mean particle diameter of from 8 to 800 $\mu$m, preferably from 30 to 500 $\mu$m, and from 20 to 40, preferably from 25 to 35, % by volume of a linear polyesterurethane obtained from adipic acid, 1,4-butanediol and 4,4-diisocyanatodiphenylmethane, from 15 to 25, preferably from 18 to 20, % by volume of a polyphenoxy resin obtained from bisphenol and epichlorohydrin and from 10 to 25, in particular from 15 to 20, % by volume of a polyisocyanate resin. In addition to the amounts, not exceeding 2% by volume, of a known dispersant and of a lubricant, it may be advantageous also to add not more than 1.5% by volume of a carbon black to the dispersion.

Because of the special backing layer, the novel magnetic recording media have extremely advantageous running behavior. Because the back of such magnetic recording media is mechanically stable and hard-wearing, corresponding video tapes have a greatly reduced number of errors compared with those of the prior art. If the magnetic layer of the novel magnetic recording media is based on chromium dioxide, such magnetic tapes are particularly suitable for the TMD method. The transparency of this backing layer to infrared light furthermore ensures that the chromium dioxide in the magnetic layer can be heated above the Curie point substantially without loss, ie. without a laser current increase required in comparison with magnetic tapes without a backing layer.

The Examples which follow illustrate the invention and compare it with prior art experiments. In the Examples and Comparative Experiments, parts and percentages are by volume, unless stated otherwise.

EXAMPLE 1

3,325 parts of zirconium dioxide spheres having a diameter of 1.0–1.25 mm, 71.5 parts of a precipitated silica having a mean agglomerate size of 3 $\mu$m, 6.8 parts of a cubic zinc ferrite having a mean particle size of 0.12 $\mu$m, 9.2 parts of a polyolefin having an average molecular weight of 3,000 and a mean spherical particle diameter of 500 $\mu$m, 103 parts of a 14.75% strength solution of a vinyl chloride copolymer having an average molecular weight of 35,000 and a hydroxyl content of 1.8% by weight in a mixture of 45.74 parts of tetrahydrofuran and 39.51 parts of dioxane, 162 parts of a 10.62% strength solution of a linear polyesterurethane resin, prepared from adipic acid, 1,4-butanediol and 4,4-diisocyanatodiphenylmethane, in a mixture of 47.95 parts of tetrahydrofuran and 41.43 parts of dioxane, 2.8 parts of an isomeric $C_{18}$-carboxylic acid, and 848 parts of a mixture of 455 parts of tetrahydrofuran and 393 parts of dioxane were introduced into a batchwise stirred ball mill having a volume of 10,000 parts. The stirred ball mill was then closed and the contents were dispersed for 6 hours. Thereafter, the mill was opened again and 14.52 parts of 9.26% strength solution of dibutyltin laurate in a mixture of 48.68 parts of tetrahydrofuran and 42.06 parts of dioxane, 5.7 parts of an 8.5% strength solution of a fluorine additive in a mixture of 49.10 parts of tetrahydrofuran and 42.4 parts of dioxane, 751 parts of a 10.62% strength solution of the linear polyesterurethane resin described above in a mixture of 47.95 parts of tetrahydrofuran and 41.43 parts of dioxane, 414.75 parts of a 14.75% strength solution of the vinyl copolymer described above in a mixture of 45.74 parts of tetrahydrofuran and 39.51 parts of dioxane, 1807.5 parts of a mixture of 969.65 parts of tetrahydrofuran and 837.85 parts of dioxane were introduced and milling was continued for a further 3 hours.

The dispersion was then removed from the mill. In order to crosslink the layer after application, 30 parts of a 41.6% strength solution of an isocyanate resin obtained from 1 mol of trimethylolpropane and 3 mol of toluylene diisocyanate in 58.4 parts of a tetrahydrofuran, per 1,000 parts of the dispersion, were stirred in for 15 minutes. After filtration through a paper filter, the dispersion was applied to a 15 $\mu$m thick polyethylene terephthalate film by means of an engraved roller and was dried in the drying tunnel of the coating machine. The resulting backing layer was 0.5 $\mu$m thick.

The backing layer was very uniform and devoid of any stripes. The pigment volume concentration of the silica in the layer was 22.48%, that of the zinc ferrite was 2,14% and that of the polyolefin was 2.9%. For further processing, the magnetic layer containing $CrO_2$ as magnetic pigment was then applied in a conventional manner in a thickness of 2.5 $\mu$m to the film side opposite the backing layer. After calendering, the film web was slit into 12.7 mm wide (½ inch) tapes. The tapes were then tested as follows:

the laser current required to obtain satisfactory copies was measured. This must not be higher than for a tape free of a backing layer since the laser current requirement limits the life of the laser lamp. To measure the wear-resistance properties of the backing layer, a continuous loop of the test tape was passed for 8 minutes, under a tension of 60 p, over a cleaning fleece with the back facing the fleece (v=20 cm/s). The number of scratches before and after the test was determined optically. The fewer scratches present or formed during the test, the more hard-wearing is the backing layer. This test is important for the operational reliability of the tapes in the TMD copying machine, in which the tapes are constantly passed over a fleece. Deposits lead to errors and make continuous changing of the cleaning fleece essential. The results are shown in Table 1.

EXAMPLE 2

The procedure was as described in Example 1, except that spherical $\alpha$-$Fe_2O_3$ having a mean particle size of 0.3 $\mu m$ was used instead of a cubic zinc ferrite, and the pigment volume concentration of the silica was 24.86%, that of the $\alpha$-$Fe_2O_3$ was 1.05% and that of the polyolefin was 2.85%. The backing layer was likewise applied in a thickness of 0.5 $\mu m$. The results are shown in Table 1.

EXAMPLE 3

The procedure was as described in Example 1, except that an $\alpha$-$Al_2O_3$ having a mean particle size of 0.1–0.2 $\mu m$ was used instead of the cubic zinc ferrite. The pigment volume concentration of the silica was 24.81%, that of the $\alpha Al_2O_3$ was 1.23% and that of the polyolefin was 2.85%. The results are shown in Table 1.

EXAMPLE 4

Instead of the VC copolymers stated in Example 1, 107 parts of a 16.83% strength solution of a polyphenoxy resin obtained from bisphenol A and epichlorohydrin and having 6% by weight of hydroxyl groups in a mixture of 44.62 parts of tetrahydrofuran and 38.55 parts of dioxane were introduced in dispersion phase I and a further 431 parts of the same solution were introduced in phase II. The other parameters remained unchanged. The pigment volume concentrations in the layer were 21.05% for the silica, 1.99% for the cubic zinc ferrite and 2.71% for the polyolefin. The results are shown in the table.

EXAMPLE 5

The procedure was as described in Example 4, except that, instead of the polyolefin stated in Example 1 having an average molecular weight of 3,000, 9.2 parts of a polyolefin having an average molecular weight of 6,000, a mean spherical particle diameter of 30 $\mu m$ and a density of 0.92 $g/cm^3$ were used. The pigment volume concentrations in the layer were 21.06% for the silica, 2.0% for the cubic zinc ferrite and 2.63% for the polyolefin. The results are shown in Table 1.

EXAMPLE 6

The procedure was as described in Example 4, except that, instead of the polyolefin stated in Example 1, 9.2 parts of a polymeric, polyolefinic filler having an average molecular weight of 6,500, a mean spherical particle diameter of 300 $\mu m$ and a density of 0.96 $g/cm^3$ were used. The pigment volume concentrations were 21.06% for the silica, 2.0% for the cubic zinc ferrite and 2.63% for the polyolefin. The results are shown in Table 1.

EXAMPLE 7

The procedure was as described in Example 4. Instead of the 9.2 parts of the polyolefin used in Example 1, 18.7 parts of the same polyolefin were employed. The pigment volume concentrations were 20.49% for the silica, 1.95% for the cubic zinc ferrite and 5.29% for the polymeric filler. The results are shown in Table 1.

EXAMPLE 8

The procedure was as described in Example 4, except that, instead of the polyolefin stated in Example 1 having a mean spherical particle size of 500 $\mu m$, 9.0 parts of a polyolefin having a mean spherical particle size of 8 $\mu m$ and a density of 0.94 $g/cm^3$ were used. The pigment volume concentration was 21.06% for the silica, 2.0% for the cubic zinc ferrite and 2.63% for the polymeric, polyolefinic filler. The results are shown in Table 1.

EXAMPLE 9

The procedure was as described in Example 4, except that a highly conductive carbon black having a specific surface area of 1000 $m^2/g$ was concomitantly used. Instead of the 71.5 parts of the precipitated silica, only 67.4 parts of said! silica and 6.8 parts of the cubic zinc ferrite and 4.5parts of the highly conductive carbon black were introduced.

The pigment volume concentration was 20.25% for the silica, 2.05% for the cubic zinc ferrite, 1.39% for the carbon black and 2.79% for the polyolefin. The results are shown in Table 1.

EXAMPLE 10

The procedure was as described in Example 4, except that, instead of the 71.5 parts of the precipitated silica, 31.8 parts of a finely divided 0.11 $\mu m$ $BaSO_4$ having an oil absorption of 24 ml/100 g were used. All other parameters remained unchanged. The pigment volume concentration was 13.84% for the $BaSO_4$, 2.98% for the cubic zinc ferrite and 4.05% for the polymeric, polyolefinic filler. The results are shown in Table 1.

COMPARATIVE EXPERIMENT 1

A backing layer dispersion was prepared according to Example 1 of EP-A 101 020, except that dispersing was carried out in a batchwise stirred ball mill having a capacity of 10,000 parts by volume and containing 3,325 parts of zirconium dioxide balls having a diameter of 1.0–1.25mm. 126.3 parts of carbon black, 63.15 parts of a silica gel treated with organic substances, 8 parts of cubic zinc ferrite, 2194.5 parts of a mixture of 1223.6 parts of tetrahydrofuran and 970.9 parts of dioxane, 10.2 parts of stearic acid, 553.3 parts of a 16.36% solution of a polyurethane resin obtained from 44:56 trimethylolpropane/1,6-hexanediol in a mixture of 44.87 parts of tetrahydrofuran and 38.77 parts of dioxane, and 838.6 parts of a 16.83% strength solution of a polyphenoxy resin obtained from bisphenol A and epichlorohydrin and having 6% by weight of hydroxyl groups in a mixture of 44.62 parts of tetrahydrofuran and 38.55 parts of dioxane were introduced into said mill.

The batch was then milled for 6 hours, after which 1283 parts of a 10.25% strength solution of a saturated polyester resin, prepared from 1:2 terephthalic/isophthalic acid and ethylene glycol, in a mixture of 48.15 parts of tetrahydrofuran and 41.6 parts of dioxane, 871.6 parts of a 10.62% strength solution of a linear polyesterurethane resin, prepared from adipic acid, 1,4-butanediol and 4,4'-diisocyanatodiphenylmethane, in a mixture of 47.95 parts of tetrahydrofuran and 41.43 parts of dioxane, 11.6 parts of butyl stearate and 478.5 parts of a 41.6% strength solution of an isocyanate resin obtained from 1 mol of trimethylolpropane and 3 mol of toluylene diisocyanate in 58.4 parts of tetrahydrofuran were added. Stirring was carried out for a further 15 minutes, after which homogenization was complete and the backing layer dispersion was filtered through a paper filter and applied to a 15 μm polyethylene terephthalate film by means of an engraved roller and dried in a drying tunnel of the coating machine. The thickness of the backing layer was 0.5 pm. The pigment volume concentrations in the layer were 14.3% for carbon black, 5.81% for the silica and 0.74% for the cubic zinc ferrite. For further processing, the magnetic layer was applied in a conventional manner in a thickness of 2.5 μm to the film side opposite the backing layer. After calendering and slitting of the block into ½ inch wide tapes, the latter were tested as described under Example 1. The results are shown in Table 1.

COMPARATIVE EXPERIMENT 2

A backing layer dispersion was prepared according to Example 1 of EP-A 105 471 from 93 parts of $BaSO_4$ having a mean particle size of 0.08 μm, 20 parts of α-$Fe_2O_3$ having a mean particle size of 0.1 μm, 85.98 parts of nitrocellulose, 78.33 parts of polyesterurethane, 32 parts of a trifunctional isocyanate resin, 5.81 parts of n-butyl stearate, 11.62 parts of myristic acid, 1057 parts of cyclohexanone and 1157.4 parts of toluene. The 10 backing layer dispersion was applied to give a 0.5 μm thick layer. The pigment volume concentrations in the backing layer were 31.64% for $BaSO_4$ and 6.8% for α-$Fe_2O_3$. Comparative Experiment 2 was further processed and tested in the same way as the other Examples. The results are shown in Table 1.

COMPARATIVE EXPERIMENT 3

The procedure was as described in Example 1, except that, instead Of the cubic zinc ferrite and the polyolefin, 81.0 parts of the precipitated silica and 8.85 parts of the highly conductive carbon black described in Example 9 were used. The 0.5 μm thick layer contained precipitated silica in a pigment volume concentration of 21.56% and carbon black in a concentration of 2.47%. Further processing and testing were carried out as described. The results are shown in Table 1.

COMPARATIVE EXPERIMENT 4

In this Experiment, no backing layer was applied but only the magnetic layer containing $CrO_2$ as magnetic material having a coercive force of 51 kA/m. Further processing and testing were carried out as for the other Examples. The results are shown in Table 1.

ties were measured by using the video tape of Comparative Experiment 4 as a reference tape, ie. at 0 dB. The signal-to-noise ratio (S/N), the color noise modulation (CNM) and the HF output were measured. The results are shown in Table 2.

TABLE 2

| Video values* | Example A/1 | Example A/4 |
|---|---|---|
| S/N [dB] | +2 | +1 |
| CNM [dB] | +2.5 | +2 |
| HF output [dB] | +2 | +2 |

TABLE 2

We claim:
1. A flexible magnetic recording medium consisting essentially of a non-magnetic substrate in tape form having a first main side and a second main side opposite to the first main side, a magnetic layer applied to said first main side of said substrate and a backing layer formed on said second main side from a dispersed mixture consisting essentially of an organic polymer, from 2.5 to 25 % by volume of a filler, from 0.5 to 3 % by volume of an auxiliary pigment, and from 1-10% by volume of spherical shaped polyolefin particles having a mean particle size of from 1-1000 μm and a density of from 0.9 to 1.0 g/cm³, said backing layer being obtained by dispersing said mixture and applying said mixture to said second main side of said substrate, wherein said backing layer has a layer thickness after solidification of said mixture of from 0.1 to 2.0 μm and a transparency to infra-red light and energy absorbtion enabling transmission of an infra-red laser beam for heating of said magnetic layer.

2. A flexible magnetic recording medium as defined in claim 1, wherein the polyolefin has a mean particle size of from 30 to 500 μm.

3. A flexible magnetic recording medium as defined in claim 1, wherein the polyolefin is a low density polyolefin having an average molecular weight of from 3,000 to 25,000.

4. A flexible magnetic recording medium as defined in claim 1, wherein the filler is at least one particulate compound selected from the group consisting of $SiO_2$, $CaCO_3$, $BaSO_4$ and $CaSO_4$ having a mean agglomerate size of from 0.05 to 4 μm.

5. A flexible magnetic recording medium as defined in claim 1, Wherein the auxiliary pigment is at least one particulate compound selected from the group consisting of $Al_2O_3$, α-$Fe_2O_3$, $TiO_2$, cubic zinc ferrite and $Cr_2O_3$ having a mean agglomerate size of from 0.1 to 0.5 μm.

TABLE 1

| | Examples | | | | | | | | | | Comparative Experiments | | | |
|---|---|---|---|---|---|---|---|---|---|---|---|---|---|---|
| | 1 | 2 | 3 | 4 | 5 | 6 | 7 | 8 | 9 | 10 | 1 | 2 | 3 | 4 |
| Laser current in amp in standard TMD copying method | 32 | 32 | 32 | 32 | 32 | 32 | 32 | 32 | 33 | 32 | not possible | 34 | 35 | 32 |
| Scratches | | | | | | | | | | | | | | |
| before test | 0 | 0 | 0 | 1 | 2 | 2 | 0 | 4 | 1 | 2 | 1 | 0 | 10 | 2 |
| after test | 0 | 1 | 1 | 2 | 3 | 7 | 2 | 11 | 3 | 5 | 3 | 2 | >50 | >50 |

EXAMPLE A

An image was recorded on video tapes obtained according to Example 1, Example 4 and Comparative Experiment 4 (magnetic tape without backing layer) on a standard TMD copying apparatus. The video proper- 6. A flexible magnetic recording medium as defined in claim 1, wherein the mixture used for the backing layer also contains not more than 1.5% by volume of carbon black.

* * * * *